United States Patent [19]

Sakuma

[11] 4,169,056
[45] Sep. 25, 1979

[54] SINGLE TYPE FILTER PRESS
[75] Inventor: Hiroshi Sakuma, Nagoya, Japan
[73] Assignee: NGK Insulators, Ltd., Nagoya, Japan
[21] Appl. No.: 936,790
[22] Filed: Aug. 25, 1978

Related U.S. Application Data

[63] Continuation of Ser. No. 782,346, Mar. 29, 1977, abandoned.

[30] Foreign Application Priority Data

Apr. 9, 1976 [JP] Japan .................................. 51-40115
Oct. 22, 1976 [JP] Japan .................................. 51-126035

[51] Int. Cl.² ...................... B01D 25/12; B01D 25/34
[52] U.S. Cl. ..................................... 210/225; 210/230
[58] Field of Search .............................. 210/224–231

[56] References Cited

U.S. PATENT DOCUMENTS

| 3,289,844 | 12/1966 | Emele | 210/230 X |
| 3,360,130 | 12/1967 | Kaga | 210/225 |
| 3,669,273 | 6/1972 | Kurita | 210/225 |
| 3,698,557 | 10/1972 | Ishigaki | 210/225 |
| 3,767,052 | 10/1973 | Shibasaki | 210/225 |
| 3,807,567 | 4/1974 | Iwatani | 210/225 |
| 3,968,039 | 7/1976 | Inujima et al. | 210/225 |
| 4,032,450 | 6/1977 | Iwatani | 210/230 |

FOREIGN PATENT DOCUMENTS 47-27868 7/1972 Japan ........................................ 210/230

Primary Examiner—Robert H. Spitzer
Attorney, Agent, or Firm—Stevens, Davis, Miller & Mosher

[57] ABSTRACT

A single type filter press comprising a plurality of vertically suspended filter plates, with which any filter frame is not provided, is disclosed. The filter press comprises a plurality of U-shaped filter cloths. Each filter cloth is guided by a guide roller rotatably mounted at the lower part of each filter plate and has upper ends connected through filter cloth holding rods and a cord-shaped driving member to a driving wheels. When the filter cloths are opened, the driving wheel is rotated in opposite direction so as to move the filter cloth upwardly and downwardly, thereby discharging cake adhered to the cloths.

6 Claims, 7 Drawing Figures

SINGLE TYPE FILTER PRESS

This is a continuation of application Ser. No. 782,346, filed Mar. 29, 1977, abandoned.

This invention relates to a single type filter press comprising a plurality of vertically suspended filter plates, with which any filter frame is not provided, and an upwardly and downwardly movable filter cloth.

A so-called single type filter press which does not require any filter frame interposed between two adjacent filter plates has a filtering area per unit installation area which is larger than that of a so-called double type filter press which requires the filter frame. Such single type filter press, therefore, may be used as various kinds of machines for separating solids from liquids.

Conventional single type filter press which has widely been used makes use of a so-called center feed mechanism for supplying slurry through a center part of a filter plate. In such slurry supplying mechanism, a filter cloth is secured to a center part of the filter plate by means of a metal fitting, so that it is extremely difficult to remove a dehydrated cake from the filter cloth. As a result, the dehydrated cake must manually or mechanically be scraped off from the filter cloth.

A single type filter press comprising a movable filter cloth has also been well known. Such conventional filter press, however, has the disadvantages that which requires a number of parts and hence is complex in construction and liable to be frequently damaged, that which is troublesome in adjustment to be effected prior to operation, and that which is very expensive.

In addition, a filter cloth travelling mechanism in which each filter plate is provided with an independent filter cloth which is adapted to be taken up by independent motor has also been well known. Such kind of filter cloth travelling mechanism, however, is required to provide an independent motor for every filter plate and hence not only requires driving motor whose number is equal to that of the filter plates but also requires various kinds of complex mechanisms for synchronously moving all of the filter cloths.

A further modified filter cloth travelling mechanism in which both ends of the filter cloth holding rod for suspending the filter cloth are connected to a lifting rail having a length which is substantially equal to the overall length between front and rear stationary frames of the filter press and the filter cloth is directly moved by raising and lowering the lifting rail has also been proposed. In such kind of the filter cloth travelling mechanism, moving distance and speed of the filter cloth are just the same as those of the lifting rail, so that a large space is required for the movement of lifting rail. In addition, the filter cloth travelling mechanism becomes large in size and there occurs various hindrances in the case of opening and closing the filter plates, etc., and hence is of not always satisfactory one.

An object of the invention, therefore, is to provide a single type filter press which can eliminate the above mentioned drawbacks and problems which have been encountered with the conventional filter presses and which is simple in construction and can operate without trouble.

Another object of the invention is to provide a single type filter press provided with a filter cloth travelling mechanism which can convert a short moving distance at a low moving speed of a lifting rail into a long moving distance at a high moving speed of a filter cloth.

A feature of the invention is the provision of a single type filter press comprising a plurality of vertically suspended filter plates, a plurality of elongate guide rollers each arranged in parallel with and rotatably mounted on the lower part of each filter plate, a pair of supporting columns secured to both sides of the upper end of alternate filter plates, a rotary shaft rotatably supported by said pair of supporting columns and provided with a pair of driving wheels, a U-shaped filter cloth arranged at both surfaces of each filter plate and guided by the elongate guide roller, a filter cloth holding rod arranged at opposite surfaces of the filter plate with the supporting column provided thereon and connected to the two contiguous upper end of the contiguous U-shaped filter cloths, and a cord-shaped driving member engaged with the driving wheel and downwardly suspended therefrom, the lower ends of the cord-shaped driving member being connected to the filter cloth holding rods, respectively, whereby rotation of the driving wheel in opposite directions causing the filter cloth secured to the filter cloth holding rods to move upwardly and downwardly.

The invention will now be described in greater detail with reference to the accompanying drawings, wherein.

Figure 1:
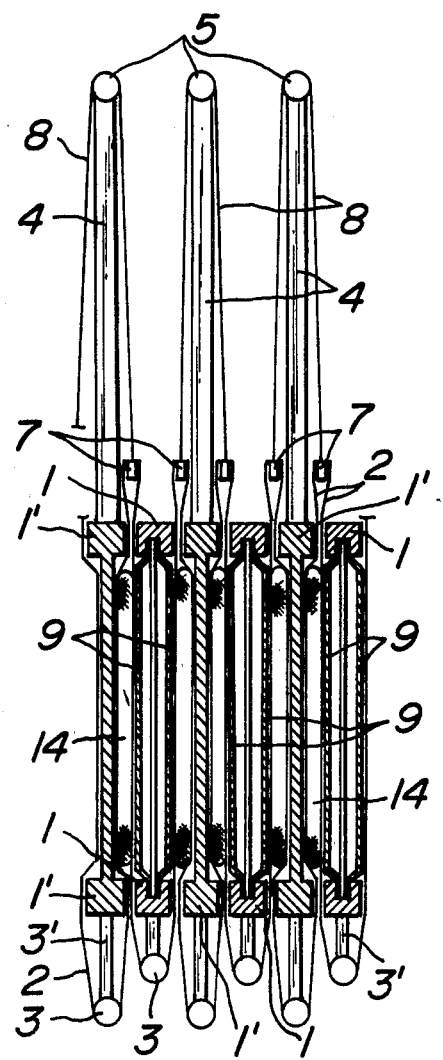
FIG. 1 is a diagrammatic front elevational view showing main parts of one embodiment of a single type filter press according to the invention, a part being shown in section.
Figure 2:
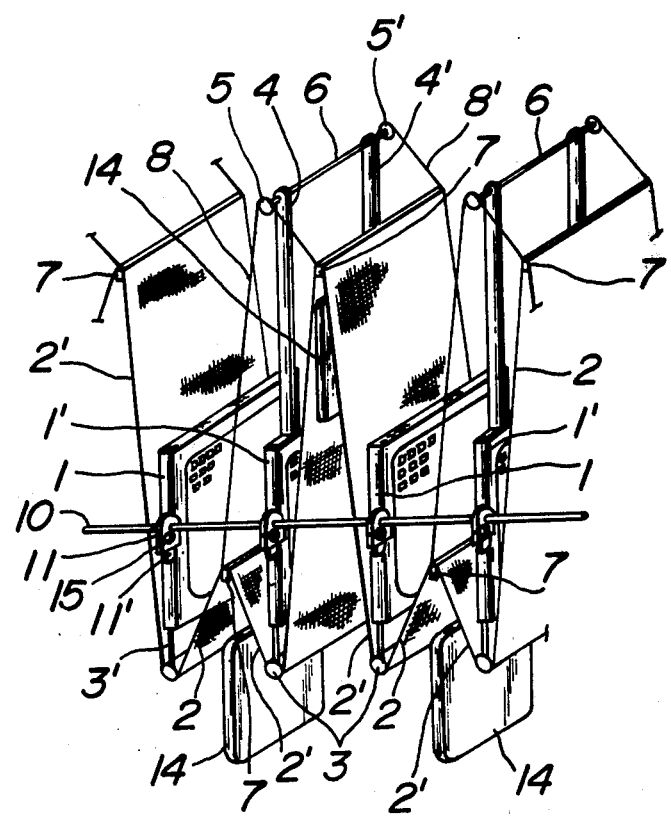
FIG. 2 is its diagrammatic perspective view.

In FIGS. 1 and 2 is shown one embodiment of a single type filter press according to the invention. In the present embodiment, a plurality of filter plates 1, 1' are downwardly suspended from a pair of supporting rods connected across front and rear stationary frames of the filter press. Each filter plate 1, 1' is provided at its lower part with an elongate guide roller 3 having a width which is equal to that of a filter plate. The elongate guide roller 3 is arranged in parallel with each filter plate 1, 1' and rotatably supported through a supporting arm 3' by each filter plate 1, 1'. Alternate filter plate 1' is provided at both sides of its upper end with a pair of supporting columns 4, 4' secured thereto and having a height which is substantially equal to that of the filter plate 1'. The pair of supporting columns 4, 4' are connected with each other by means of a rotary shaft 6 provided with a pair of driving wheels 5, 5'. At opposite surfaces of each filter plate 1, 1' is arranged at U-shaped filter cloth 2 guided by the elongate guide roller 3. The upper ends of the U-shaped filter cloth 2 are connected to filter cloth holding rods 7, respectively, which are downwardly suspended from the driving wheels 5, 5' through a pair of cord-shaped driving members 8, 8' which are engaged with driving wheels 5, 5', respectively.

If the driving wheels 5, 5' are rotated in counter clockwise or clockwise directions, the cord-shaped driving members 8, 8' engaged with the driving wheels 5, 5' cause the half member of filter cloths 2 to move upwardly and the rest of filter cloths 2 to move downwardly, like seesaw movement.

As shown in FIG. 1, in the single type filter press according to the invention, it is preferable that alternate filter plate 1 is provide at its opposite surface with a compression mechanism composed of a pair of diaphragms 9.

As shown in FIG. 2 a liquid feeding mechanism comprises a plurality of nozzle blocks 11 secured to a rotary shaft 10 extending along either side of the filter plates 1, 1' and rotatably mounted on front and rear frames of the filter press. Each of these nozzle blocks 11 is slidably mounted on the rotary shaft 10. Each of the nozzle blocks 11 is provided with a hole 15 extended therethrough and adapted to form a liquid supply passage when all of the filter plates 1, 1' are closed. Each hole 15 is communicated with the front end of a nozzle 11' which is adapted to be inserted into a space formed between two portions 2, 2' of the filter cloth by rotating the rotary shaft 10.

Figure 3:
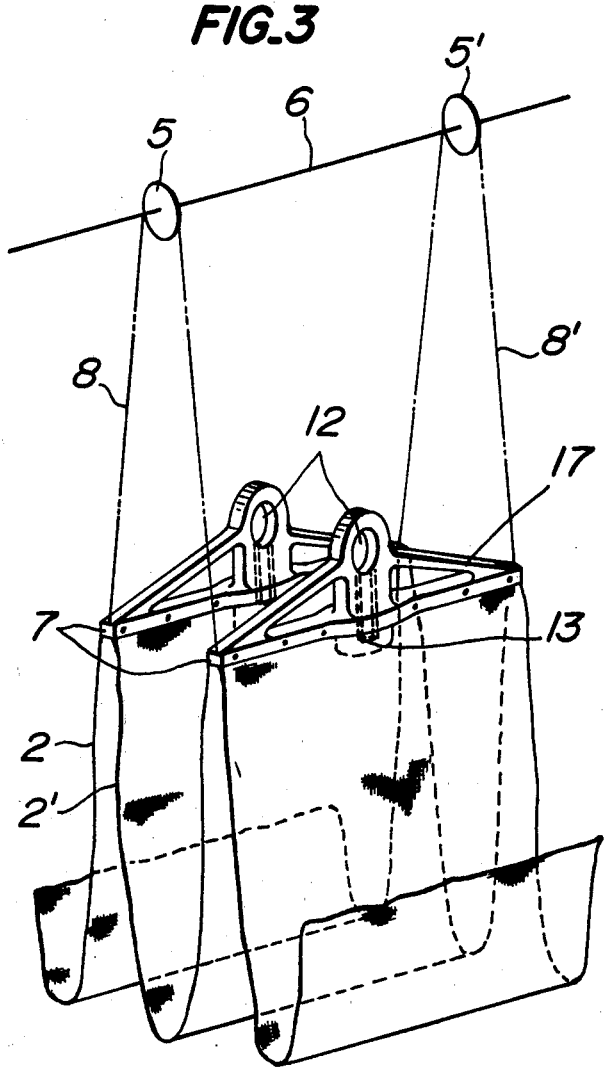
FIG. 3 is a diagrammatic perspective view showing a modified embodiment of a filter cloth holding bar for constituting a liquid supplying mechanism.

In FIG. 3 is shown a modified embodiment of the liquid supply mechanism according to the invention. In the present embodiment, the liquid supply mechanism comprises a filter cloth holding rod 7 and a sticking up frame 17 connected with the rod 7 and provided at its top with a hole 12. When the filter plates are closed, all of these holes 12 function to form a slurry passage extending in parallel with the axis of the filter press. The hole 12 is communicated with a slurry supply opening 13 adapted to be terminated at a space formed between two adjacent portions 2, 2' of the filter cloth.

The single type filter press constructed as above described according to the invention will operate as follows. After all of the filter plates 1, 1' have been closed to remove solids from slurry as cakes 14, the filter plates 1, 1' are separated from each other. Then, all of the rotary shafts 6 are synchronously rotated in a counter clockwise direction. As a result, the driving wheels 5, 5' become rotated in the counter clockwise direction to move the cord-shaped driving members 8, 8' in a way such that the filter cloth holding rod 7 at the right side of the columns 4, 4' is moved upwardly. So, the filter cloth holding rod 7 at the left side of the columns 4, 4' is moved downwardly. As the result, the two adjacent portions 2, 2' of the filter cloth connected to the downwardly moved filter cloth holding rod 7 are separated from each other at the guide roller 3. As a result, the space between the two adjacent portions 2, 2' of the filter cloth becomes enlarged, thereby separating the cake 14 deposited at the left side of the columns 4, 4' and discharging the cake 14 downwardly.

After all of the cakes 14 deposited at the left side of the columns 4, 4' have been discharged downwardly, the rotation of the rotary shaft 6 is stopped. Then, the rotary shaft 6 is rotated in a clockwise direction so as to reversely effect the above described operation. As a result, all of cakes 14 deposited at the right side of the columns 4, 4' are released from the two adjacent portions 2, 2' of the filter cloth and discharged downwardly therefrom.

Figure 4:
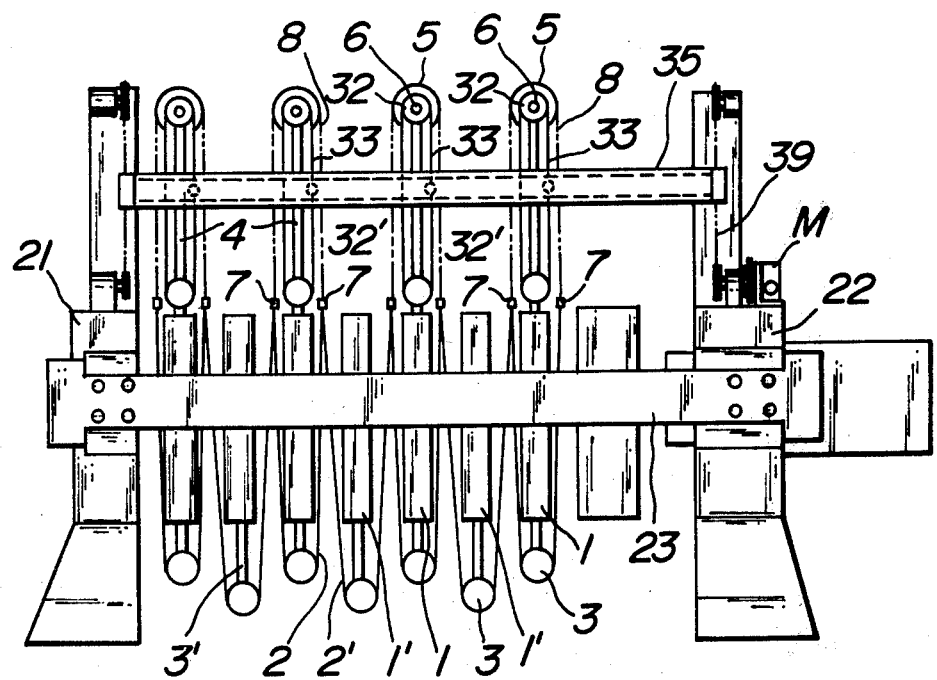
FIG. 4 is a diagrammatic front elevational view showing another embodiment of a single type filter press according to the invention provided with a modified filter cloth travelling device.
Figure 5:
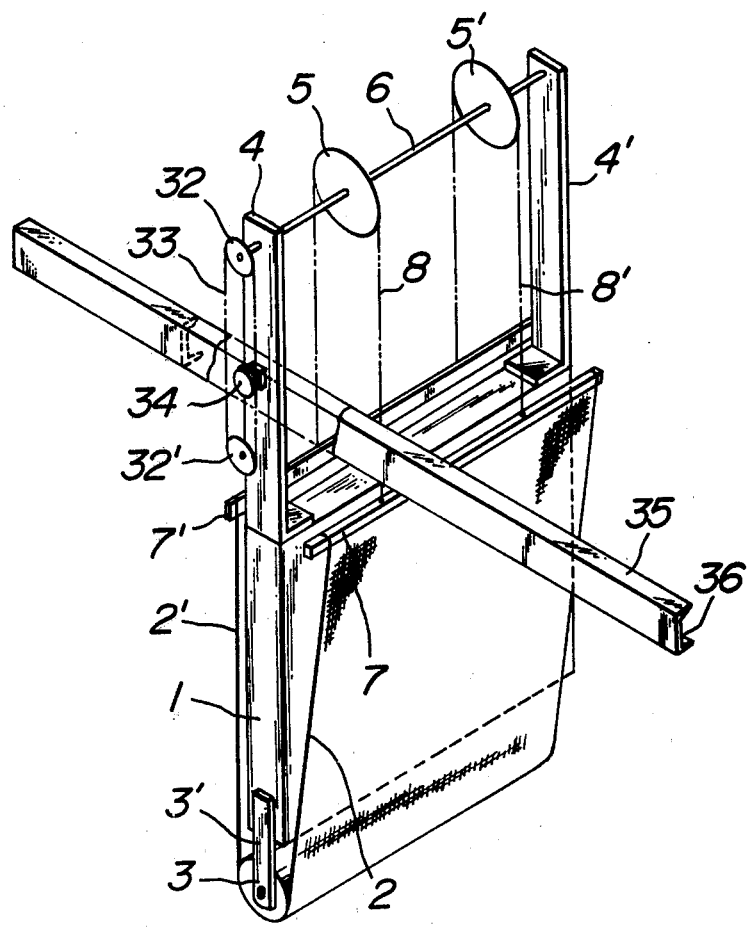
FIG. 5 is a diagrammatic perspective view showing the filter cloth travelling device shown in FIG. 4.

In FIGS. 4 and 5 is shown an embodiment of a filter cloth travelling mechanism suitably applicable to the single type filter press according to the invention. In the present embodiment, provision is made of a pair of supporting rods 23 connected across front and rear stationary frames 21, 22 of the filter press. From the supporting rods 23 are suspended a plurality of filter plates 1, 1' each of which is provided at its lower end with a guide roller 3 rotatably mounted through a supporting arm 3' thereon. A filter cloth 2, 2' is guided by the guide roller 3 and connected at its upper ends to filter cloth holding rods 7, 7', respectively. Alternate filter plate 1 is provided at its upper end with two supporting columns 4, 4' for rotatably supporting a rotary shaft 6. To the rotary shaft 6 are secured two driving wheels 5, 5' around which are engaged a pair of cord-shaped driving member 8, 8' whose lower ends are secured to the filter cloth holding rods 7, 7', respectively.

The rotary shaft 6 is provided at its one end with a sprocket wheel 32. The supporting column 4 is provided at its one side with a second sprocket wheel 32' spaced apart from the sprocket wheel 32 secured to the rotary shaft 6. An endless chain 33 is engaged with the sprocket wheels 32, 32'. In the present embodiment, in order to make the peripheral speed of the driving wheels 5 higher than that of the sprocket wheel 32, a diameter of the sprocket wheel 32 is made smaller than that of the driving wheel 5.

The endless chain 33 engaged with both the sprocket wheels 32, 32' is provided at its one portion with an idler roller 34 secured thereto. The idler roller 34 is slidably engaged with a groove 36 of a lifting rail 35 which is channel-shaped in section and movably mounted in the front and rear stationary frames 21, 22 of the filter press. The lifting rail 35 is operatively connected to an endless chain 39 so as to be moved upwardly and downwardly by driving the endless chain 39 from a motor M.

Figure 6:
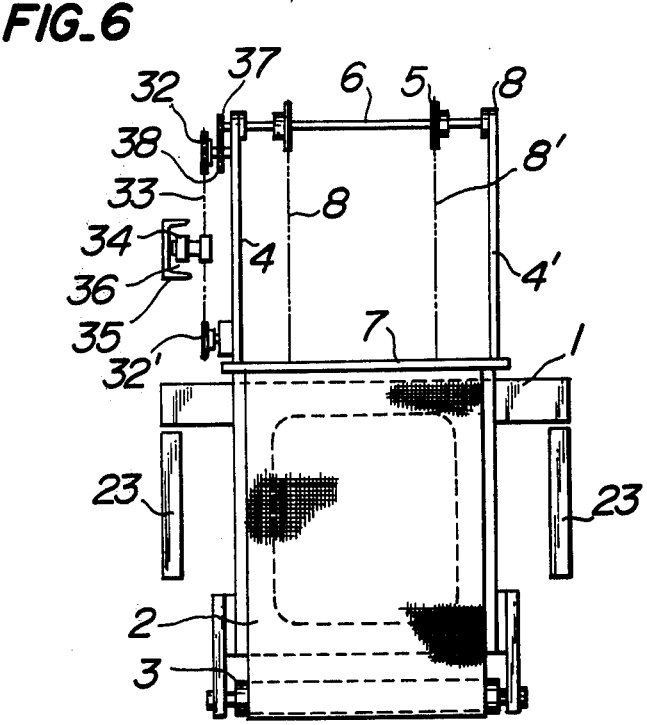
FIGS. 6 and 7 are diagrammatic end views showing another modified embodiments of the filter cloth travelling device.

In FIG. 6 is shown a modified embodiment of the filter cloth travelling device shown in FIGS. 4 and 5. In the present embodiment, both the driving wheel 5 and the sprocket wheel 32 are not connected to the same common rotary shaft 6, but the driving wheel 5 is connected through intermediate gears 37, 38 to the sprocket wheel 32. The modified embodiment constructed as above described renders it possible to multiply a ratio of the diameter of the sprocket wheel 32 to the diameter of the driving wheel 5 by a ratio of the rotation of the intermediate gear 37 to the rotation of the intermediate gear 38 and to further increase the peripheral speed of the driving wheel 5 than that of the sprocket 32.

Figure 7:
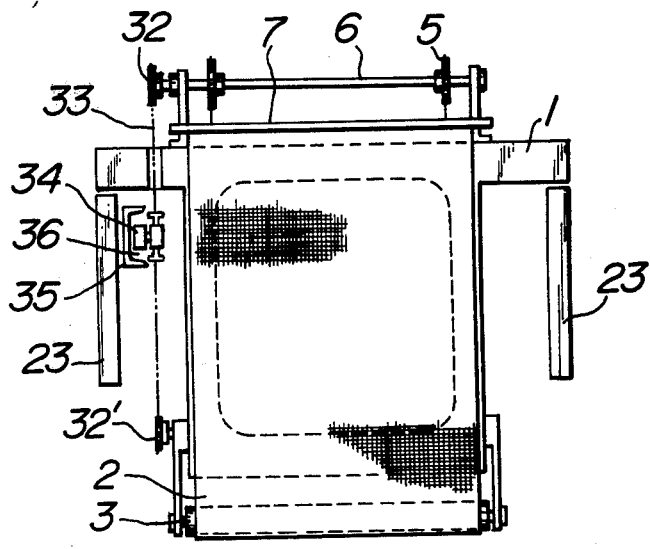

In FIG. 7 is shown another modified embodiment of the filter cloth travelling device shown in FIGS. 4 and 5. In the present embodiment, both the sprocket wheels 32, 32' are not disposed at one side surface of the supporting column 4 at the upper part of the filter plate 1, but are disposed at one side surface of the filter plate 1. The distance between the two sprocket wheels 32, 32' and the ratio of the diameter of the sprocket wheel 32 to the diameter of the driving wheel 5, etc., may suitably be selected by taking an accelerating speed ratio into consideration.

In the single type filter press constructed as described above according to the invention, the filter cloth portion 2, 2' opposed to the filtering surface of each of the filter plates 1, 1' is guided by the guide roller 3 provided at the lower end of each of the filter plates 1, 1'. Alternatively, the filter cloth portions 2, 2' may be engaged with any roller other than the guide roller 3. In addition, the cord-shaped driving member 8, 8' engaged with the driving wheel 5 and connected to these two adjacent filter cloth holding rods 7 may be rolled up around the driving wheel 5.

In the filter cloth travelling device constructed as described above, for example, as in the case of the embodiment shown in FIGS. 4 and 5, the filter cloth 2, 2' is guided by the guide roller 3 and connected at its upper ends to the filter cloth holding rods 7, 7', so that if all of the filter plates 1, 1' become open and separated from each other, the idler roller 34 slidably engaged with the groove 36 of the lifting rail 35 can slidably be moved in a horizontal direction. After all of the filter plates 1, 1' have been separated from each other, the lifting rail 35 can be moved upwardly or downwardly for a distance defined by the two sprocket wheels 32, 32'. As a result, the endless chain 33 made integral with the idler roller 34 engaged with the groove 36 of the lifting rail 35 is moved to rotate the sprocket wheel 32 at a peripheral speed which is the same as the moving speed of the chain 33. Thus, the driving wheel 5 connected to the rotary shaft 6 and having a diameter which is larger than that of the sprocket wheel 32 becomes rotated at a peripheral speed which is higher than that of the sprocket wheel 32. So, the movement of the lifting rail 35 for a short distance at a low speed is transmitted to the filter cloth holding rod 7, 7' so as to move it for a long distance at a high speed, thereby upwardly or downwardly moving the filter cloth 2, 2' at a high speed and hence discharging the cakes.

As stated hereinbefore, in the present embodiment, the filter cloth travelling device comprises the lifting rail 35 extending across the front and rear stationary frames 21, 22 of the filter press and slidably mounted thereon so as to be moved upwardly and downwardly and to travel all of the filter cloths 2, 2' each of which is separately associated with each of the filter plates 1, 1'. The use of such lifting rail 35 is capable of converting the movement of the lifting rail 35 for a short distance within the distance between the sprocket wheels 32, 32' at a low speed with the movement of the filter cloth 2, 2' for a long distance at a high speed. The lifting rail 35 moves within a norrow space, so that the mechanism is simple in construction, but can positively travel all the filter cloths 2, 2' synchronously. Thus, the filter cloth travelling mechanism is particularly applicable to the single type filter press.

As stated hereinbefore, in the single type filter press according to the invention, a pair of driving wheels 5, 5' are rotatably mounted on the upper end of the supporting column 4 secured to alternate filter plate and the rotations of the driving wheels 5, 5' in counter clockwise and clockwise directions cause the filter cloth 2, 2' secured to the filter cloth holding rod 7, 7' to move upwardly and downwardly, thereby automatically discharging the cakes 14. In addition, the single type filter press according to the invention comprises the filter cloth travelling mechanism which is simple in construction and reliable in operation. Thus, the single type filter press according to the invention may be used as a filter press for removing solids from various kinds of liquids, hence contributes greatly in industry.

What is claimed is:

1. A single type filter press comprising a plurality of vertically suspended filter plates, a plurality of elongate guide rollers, each guide roller being associated with one of said filter plates and arranged in parallel with and rotatably mounted on the lower part of its associated filter plate, a pair of supporting columns secured to both sides of the upper end of alternative filter plates and having a height substantially equal to that of said alternative filter plates, a rotary shaft rotatably supported by said pair of supporting columns and provided with a pair of driving wheels, a plurality of U-shaped filter cloths, each filter cloth sandwiching one of said filter plates and guided by the elongate guide roller associated with that filter plate, a filter cloth holding rod between each filter plate, each said rod being connected to the two contiguous upper ends of the two U-shaped filter cloths which sandwich the two filter plates between which said rod is disposed, and a discontinuous cord-shaped driving member engaged with each of said driving wheels and downwardly suspended therefrom, the ends of each of said cord-shaped driving members being connected to the ends of the filter cloth holding rods nearest the driving wheel associated with said driving member, whereby rotation of said driving wheels in opposite directions causes said filter cloth secured to the filter cloth holding rods to move upwardly and downwardly.

2. A single type filter press as claimed in claim 1, wherein said alternate filter plate is provided with a compression mechanism composed of a pair of diaphragms.

3. A single type filter press as claimed in claim 1 and further comprising a liquid supplying mechanism including a rotary shaft rotatably mounted on front and rear stationary frames of the filter press and extending along the side surface of said filter plates, a nozzle block secured to said rotary shaft and operatively associated with each of said filter plates, said nozzle back having a hole extending therethrough and forming a liquid supply passage when said filter plates are closed together and a nozzle communicated with said hole and adapted to be inserted into a space formed between two adjacent filter cloth portions.

4. A single type filter press as claimed in claim 1, and further comprising a liquid supplying mechanism including a plurality of sticking up members each provided with a filter cloth holding rod and at its top corner with a hole which when the filter press is closed forms a liquid supply passage extending in parallel with the axis of the filter press, said hole communicating with a liquid supply opening formed in said sticking up member and terminated at a space formed between the two adjacent filter cloths.

5. A single type filter press as claimed in claim 1 and further comprising a filter cloth travelling mechanism including two sprocket wheels arranged at the side surface of alternate filter plate and spaced apart from each other, an endless chain engaged with said two sprocket wheels, a lifting rail extending between two stationary frames provided at both ends of the filter press and movably mounted along said frames in upward and downward directions, and an idler roller secured to one portion of said endless chain and slidably engaged with the lifting rail, one of said sprockets being connected to said driving wheels such that the peripheral speed of said driving wheels is higher than that of said sprocket wheel, whereby the upward and downward movements of said lifting rail within the space formed between said two sprocket wheels causing all of said filter cloths to travel at a speed which is higher than the upward and downward movement of said lifting rail.

6. A single type filter press comprising a filter cloth travelling mechanism including two sprocket wheels arranged at the side surface of alternate filter plate and spaced apart from each other, and endless chain engaged with said two sprocket wheels, a lifting rail extending between two stationary frames provided at both ends of the filter press and movably mounted along said frames in upward and downward directions, and an idler roller secured to one portion of said endless chain and slidably engaged with the lifting rail, the end of said sprockets being connected to driving wheels such that the peripheral speed of said driving wheels is higher than that of said sprocket wheel, whereby the driving wheels are driven by the upward and downward movements of said lifting rail within the space formed between said two sprocket wheels, and causing all of said filter cloths, which are suspended from the driving wheels, to travel at a speed which is higher than the upward and downward movement of said lifting rail.

* * * * *